(12) United States Patent
Subbiah et al.

(10) Patent No.: US 11,729,116 B2
(45) Date of Patent: Aug. 15, 2023

(54) VIOLATION DETECTION AND ISOLATION OF ENDPOINT DEVICES IN SOFT ZONING ENVIRONMENT

(71) Applicant: DELL PRODUCTS L.P., Round Rock, TX (US)

(72) Inventors: Ramesh Kumar Subbiah, Chennai (IN); Vibin Varghese, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 119 days.

(21) Appl. No.: 16/814,089

(22) Filed: Mar. 10, 2020

(65) Prior Publication Data

US 2021/0288923 A1 Sep. 16, 2021

(51) Int. Cl.
*H04L 49/356* (2022.01)
*H04L 43/022* (2022.01)
*H04L 47/2483* (2022.01)
*H04L 9/40* (2022.01)

(52) U.S. Cl.
CPC .......... *H04L 49/357* (2013.01); *H04L 43/022* (2013.01); *H04L 47/2483* (2013.01); *H04L 63/101* (2013.01); *H04L 63/1408* (2013.01)

(58) Field of Classification Search
CPC . H04L 49/357; H04L 43/022; H04L 47/2483; H04L 63/101; H04L 63/1408

USPC ........................................................ 370/235
See application file for complete search history.

(56) References Cited

U.S. PATENT DOCUMENTS

| 10,230,688 | B1* | 3/2019 | Subbiah | H04L 61/2596 |
| 2005/0198523 | A1* | 9/2005 | Shanbhag | H04L 49/70 726/22 |
| 2013/0212209 | A1* | 8/2013 | Miyauchi | G06F 3/0607 709/213 |
| 2017/0187627 | A1* | 6/2017 | Bharadwaj | H04L 43/0829 |
| 2018/0343197 | A1* | 11/2018 | Obulisami | H04L 61/5038 |
| 2019/0319846 | A1* | 10/2019 | Dhanadevan | H04L 67/1097 |

* cited by examiner

*Primary Examiner* — Kwang B Yao
*Assistant Examiner* — Syed M Bokhari
(74) *Attorney, Agent, or Firm* — North Weber & Baugh LLP

(57) ABSTRACT

Systems and methods for handling soft zoning violations comprise assigning a first target device and an endpoint device that is coupled to a switch port of a Fibre Channel (FC) switch to a zone(s). In embodiments, in response to the endpoint device logging into the FC switch, sampled traffic that originates at the endpoint device and ingresses at the switch port may be obtained. In response to determining that the sampled traffic comprises a second traffic that is intended for a second target device that has not been assigned to the zone(s), some action to restrict the second traffic may be performed such as to restrict the non-assigned traffic and prevent devices from sending potentially harmful traffic to other devices that are not assigned to a same zone.

20 Claims, 6 Drawing Sheets

VIOLATION DETECTION AND ISOLATION OF ENDPOINT DEVICES IN SOFT ZONING ENVIRONMENT

BACKGROUND

The present disclosure relates generally to computer networking. More particularly, the present disclosure relates to detecting violations and isolation of devices in a soft zoning Fibre Channel (FC) network environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In this document the terms "device" and "ports" of a device may be used interchangeably. For example, "device membership" and "port membership" are used interchangeably.

Soft zoning provides security against unauthorized access to ports or nodes in an FC network fabric by restricting access based on membership of those devices in one or more predefined common zones within the FC network fabric. However, soft zoning is based on an honor system that when violated may cause network instability and reduce available bandwidth.

Accordingly, it is highly desirable to find flexible but secure and efficient ways to handle soft zoning violations in FC network fabrics.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
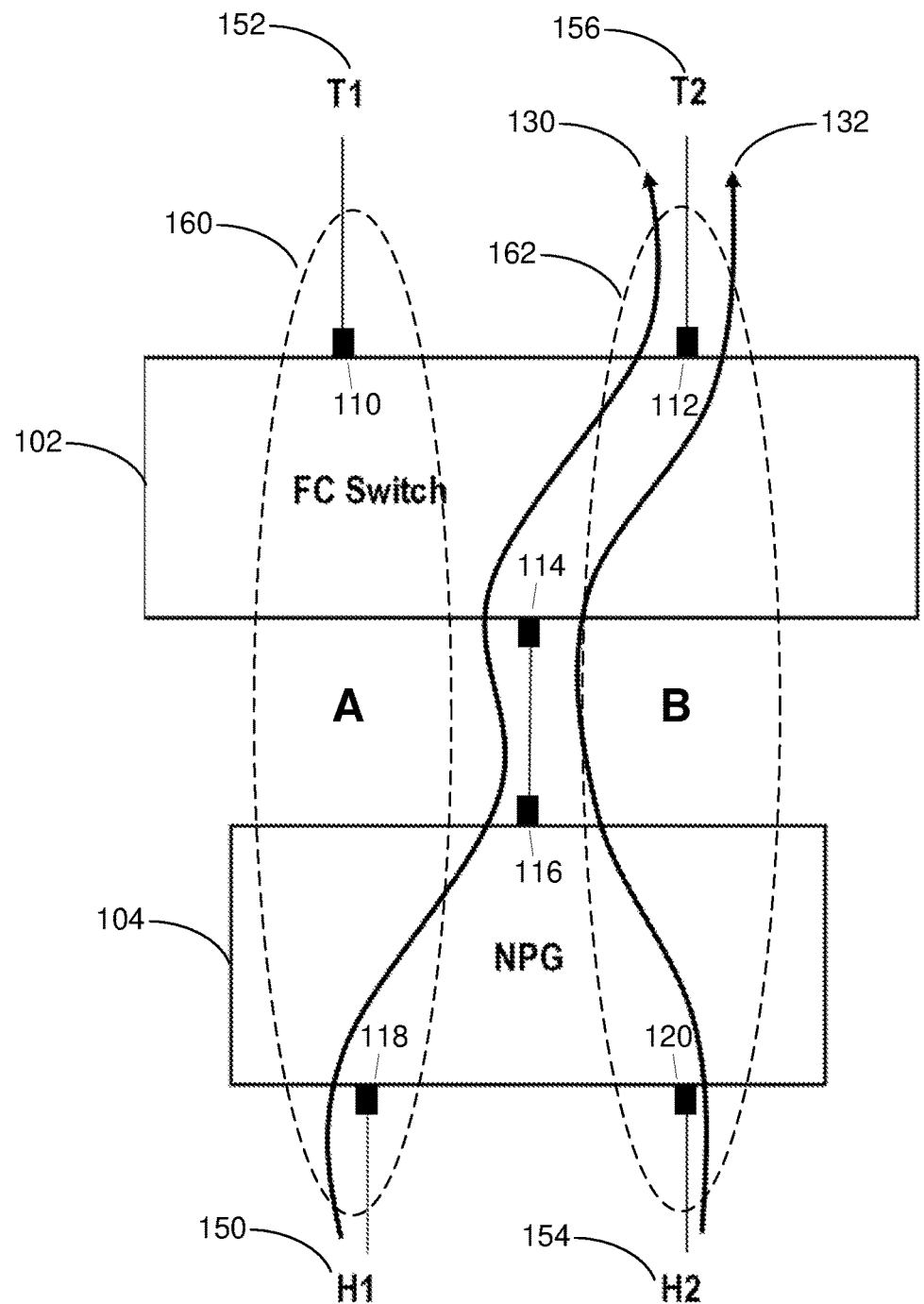
FIG. 1 is an example of how access restrictions that have been established by soft zoning may be circumvented in existing FC networks.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state. Each reference/document mentioned in this patent document is incorporated by reference herein in its entirety.

It shall be noted that although embodiments described herein may be within the context of FC and storage networks, this is not intended as a limitation on the present disclosure, as aspects of the present disclosure may equally be applied or adapted for use in other type of networks that utilize FC or Fibre Channel over Ethernet (FCoE)-based network topologies.

Soft zoning protection typically involves an FC switch that communicates with a name server, e.g., during a login process and in response to a name service request made by an endpoint device that seeks address information for a particular target device. Based on the request or query, the FC switch retrieves zoning information, such as information whether that target device matches an appropriate entry in a name server database, which indicates the availability and permission of devices to communicate with each other. Based on the retrieved zoning and other configuration information, the FC switch either accepts the request or rejects it, thus, enforcing the zoning restriction in the software control plane, and at least partially blocking or filtering out communication between the endpoint device and the target device.

This mechanism provides a simple means for restricting access to only available communication nodes at the name server level. In other words, an endpoint device that requests access to a target device will see the target device only if both the endpoint device and the target device are in the same zone. It is noted that "device" herein refers to one or more ports of a device, such as an HBA port of a host device.

In comparison, hard zoning provides additional security against unauthorized access by using an FC switch in order to perform frame filtering to actively prevent access between devices that belong to different zones in an FC network fabric. The FC switch typically uses a routing table to ensure that FC traffic that ingresses, e.g., from an endpoint device, has permission to be forwarded from an entry port to an egress port.

However, hard zoning is less flexible than soft zoning since once devices are physically disconnected and, for example, moved to another switch port, they lose their existing zone membership(s); and a new device attached to the switch port that has become available inherits the disconnected device's zone membership(s). As a result, moving around devices leaves the FC network fabric vulnerable to security breaches that require extra effort and countermeasures by an administrator wishing to implement hard zoning effectively.

While soft zoning is flexible in that physical connections may be moved without affecting zone membership, which depends only on the World Wide Name (WWN) of a device's ports, software-based zoning in existing FC networks presents its own vulnerabilities. In particular, since soft zoning does not prevent access between nodes that belong to different zones, access restrictions can be relatively easily circumvented in a number of ways, for example, to improperly access devices to gain access to sensitive information or to interfere with regular network operation.

For example, an endpoint device such as a host may directly send a port login to a previously accessed target device upon login to the fabric. Even if an FC switch or name server does not supply the endpoint device with the correct WWN of a target device that belongs to a zone different than the endpoint device, an adversary who obtains the WWN by simply trying different address combinations, will still be able to access the target device from the endpoint device and, e.g., bombard the target device with traffic.

Such soft zoning violations can lead to network instability and unnecessary bandwidth utilization. And virtual segregation provided by zones is ineffective in platforms having hardware that does not support additional access control list (ACL) spaces where only soft zoning can be implemented.

FIG. 1 is an example of how access restrictions that have been established by soft zoning may be circumvented in existing FC networks. FC network fabric 100 comprises FC switch 102, FC gateway device 104, e.g., an N_port ID virtualization gateway (NPG), endpoint devices 150, 154 (labeled H1 and H2, respectively), and target devices 152, 162 (labeled T1 and T2). FC switch 102 comprises ports 110-114, and NPG 104 comprises ports 116-120. As depicted in FIG. 1, endpoint device 150 is coupled to port 118 of NPG 104, endpoint device 154 is coupled to port 120 of NPG 104, target device 152 is coupled to port 110 of FC switch 102 and target device 156 is coupled to port 112 of FC switch 102. Port 114 of FC switch 102 is coupled to port 116 of NPG 104. Each device H1, H2, T1, T2 150-156 represents a network node in FC network fabric 100.

In operation, FC switch 102 creates an active zone, e.g., active zone, A, 160 that, according to a soft zoning configuration, comprises as nodes endpoint device H1 150 and target device T1 152. FC switch 102 further creates active zone, B, 162 that comprises endpoint device 154 and target device 156. In this example, endpoint device H2 150 is intended to send traffic only to target device T1 152 according to the soft zoning configuration. Similarly, endpoint device H2 154 is intended to send traffic only to target device T2 156.

As mentioned in the Background, since soft zoning does not prevent communication between nodes that belong to different zones, the soft zoning restrictions created or adopted by FC switch 102 can be circumvented to improperly access and send traffic to devices located outside of a predetermined zone. For example, the soft zoning implementation in FIG. 1 cannot by itself prevent endpoint device H1 150 from sending traffic directly to target device T2 156, e.g., if endpoint device H1 150 has somehow obtained the correct WWN for target device T2 156. In practice, this vulnerability may cause undesired network instability and waste bandwidth, thus, negatively impacting both system performance and the security of network fabric 100. Therefore, there is a need for efficient systems and methods that increase FC network security, while maintaining the flexibility provided by a soft zoning environment.

Figure 2:
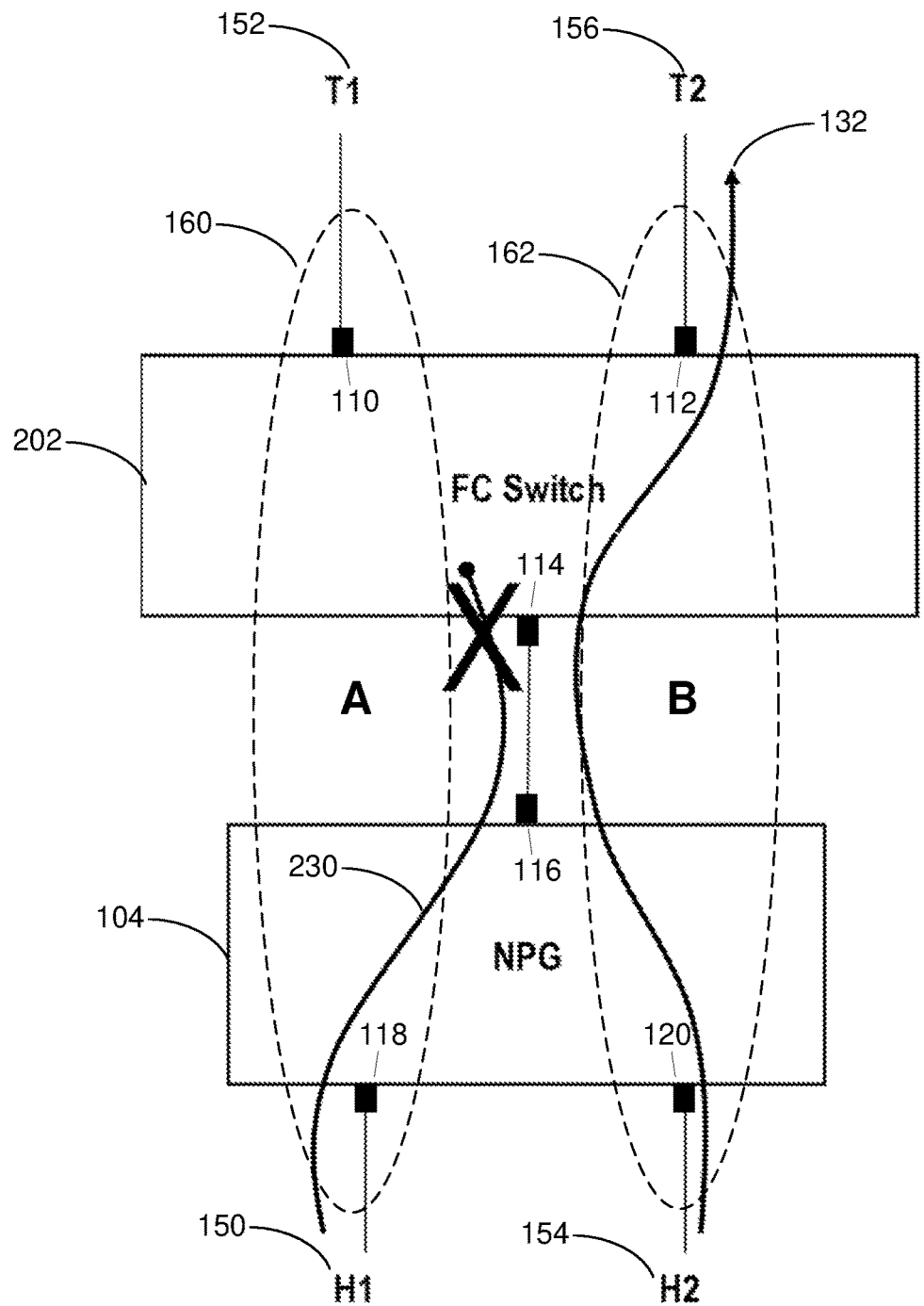
FIG. 2 illustrates an exemplary FC network fabric in a soft zoning environment that implements access restrictions according to embodiments of the present disclosure.

FIG. 2 illustrates an exemplary FC network fabric in a soft zoning environment that implements access restrictions according to embodiments of the present disclosure. Similar to FIG. 1, FC network fabric 200 comprises FC switch 202, which may be implemented in a blade chassis and comprise various network components including processor and memory devices; NPG 104; endpoint devices 150, 154; and target devices 152, 156. For clarity, components identical to those shown in FIG. 1 are labeled in the same manner. For brevity a description of their function is not repeated here.

FC switch 202 controls traffic between endpoint devices (e.g., device 150), such as hosts, and target devices in FC network fabric 200. In embodiments, FC switch 202 may create zones in FC network fabric 200. For example, in FIG. 2, a first zone 160 comprises endpoint device 150 and target device 152. It is understood that FC switch 202 may create any number of zones and associate any number of devices with each other. As an example, one or more ports of target device 152 and one or more ports of endpoint device 150 may be grouped into two, three, or more zones that associate respective ports and/or devices.

In embodiments, endpoint device 150 may login to FC switch 202, which may sample traffic originating at endpoint device 150 and ingressing at switch port 114. From on the sampled traffic, FC switch 202 may then obtain information, such as a source identifier (not shown) associated with endpoint device 150 and a destination identifier (also not shown) associated with target device 152. In embodiments, FC switch 202 may then use the obtained identifying information, e.g., to determine that the sampled traffic comprises traffic intended for target device 156, i.e., a network device that has not been assigned to the same zone 160 as endpoint device 150 but, instead, is intended to reach a device assigned to a different zone 162, or no zone at all.

In embodiments, in response to determining that the traffic sampled at switch port 114 comprises such unassigned traffic, here, traffic originating at endpoint device 150 and intended for target device 156, which that lies outside of zone 160 that endpoint device 150 has been assigned to, FC switch 202 may perform one or more actions to prevent such traffic from reaching device 156, e.g., by configuring ACL entries such as to deny permission to one or more ports of endpoint device 150 to access device 156.

In embodiments, a suitable action by FC switch 202 comprises shutting down one or more ports of endpoint device 150 that may have sent potentially harmful traffic. In embodiments, this may be accomplished by communicating instructions to NPG 104 that may comprise instructions for shutting down some or all egress ports on device 150.

It is noted that an action to disable network components or their features in order to protect network 200 need not be permanent in nature. Therefore, in embodiments, after the passing of a predetermined time period or, e.g., the occurrence of a predetermined event, some or all of a device that has been shut down for sending unwanted traffic may be reactivated, e.g., in one or more stages, and in combination with monitoring subsequent soft zoning violations.

In embodiments, in order to maintain soft zoning capability in the event of a hardware or software failure of FC switch 102, zoning information may be replicated and distributed to a number of other switches (not shown) in FC network 200 such as to enable redundancy. Advantageously, this ensures that soft zoning between devices in FC network 200 may be enforced despite the occurrence of such failure. In embodiments, zoning rules and configuration information may be communicated between network components, e.g., in the form of tables, lists, or other data structures that aid in associating endpoint devices with target devices according to zone membership.

In embodiments, enforcing soft zoning rules comprises isolating violating endpoint devices (e.g., device 150 in FIG. 2) once a zoning rule violation has been detected, e.g., by FC switch 202. In embodiments, isolating comprises identifying and isolating devices in FC network 200 that have been identified as having sent traffic outside of their assigned zone(s).

A person of skill in the art will appreciate that zoning rules and configuration information may be learned, programmed, shared between nodes in network 200, stored, and updated, e.g., by using any name server protocol known in the art and any combination of hardware and software.

Figure 3:
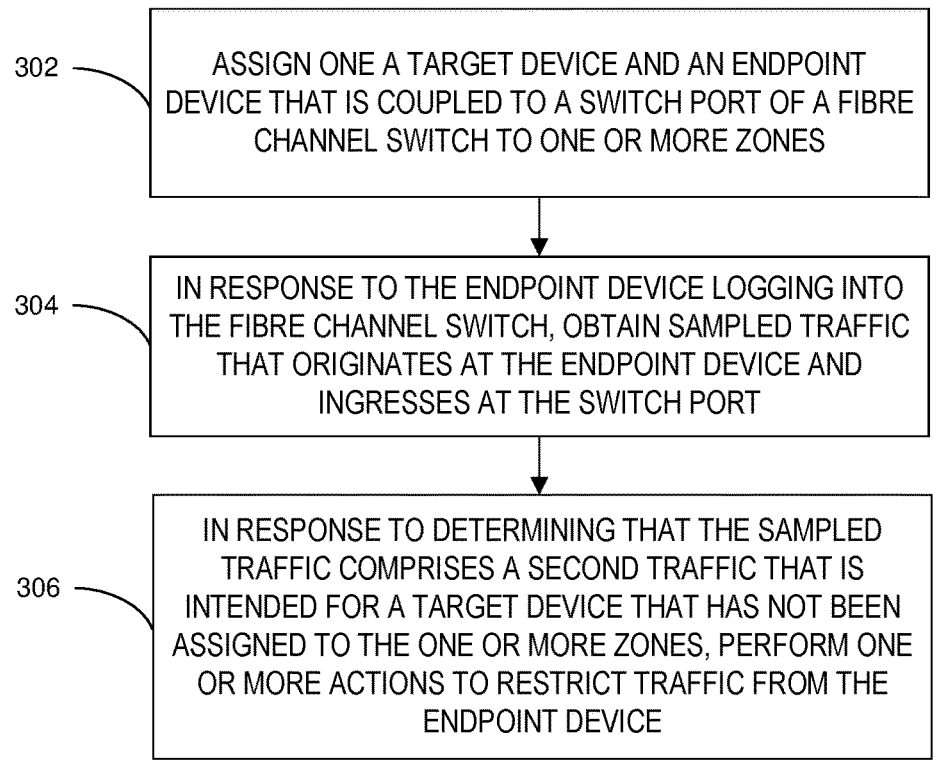
FIG. 3 is a flowchart depicting a method for handling soft zoning violations according to embodiments of the present disclosure.

FIG. 3 is a flowchart depicting a method for handling soft zoning violations according to embodiments of the present disclosure. In embodiments, the following processes may be performed, e.g., by using an FC network fabric as that depicted in FIG. 2.

In embodiments, a first target device and an endpoint device (e.g., a host device) coupled to a switch port of an FC switch are assigned to (302) one or more zones. Once the endpoint device has logged into the FC switch, traffic that originates at the endpoint device and ingresses at the switch port may be sampled to obtain (304) sampled traffic. In response to determining that the sampled traffic comprises traffic intended for a target device that has not been assigned to the one or more zones, one or more actions may be performed (306) to restrict the non-assigned traffic. In this manner, the FC switch may prevent a device from sending potentially harmful traffic to another device that is located outside of a common zone.

It shall be noted that in processes disclosed herein: (1) certain steps may optionally be performed; (2) steps may not be limited to the specific order set forth herein; (3) certain steps may be performed in different orders; and (4) certain steps may be performed concurrently.

Figure 4:
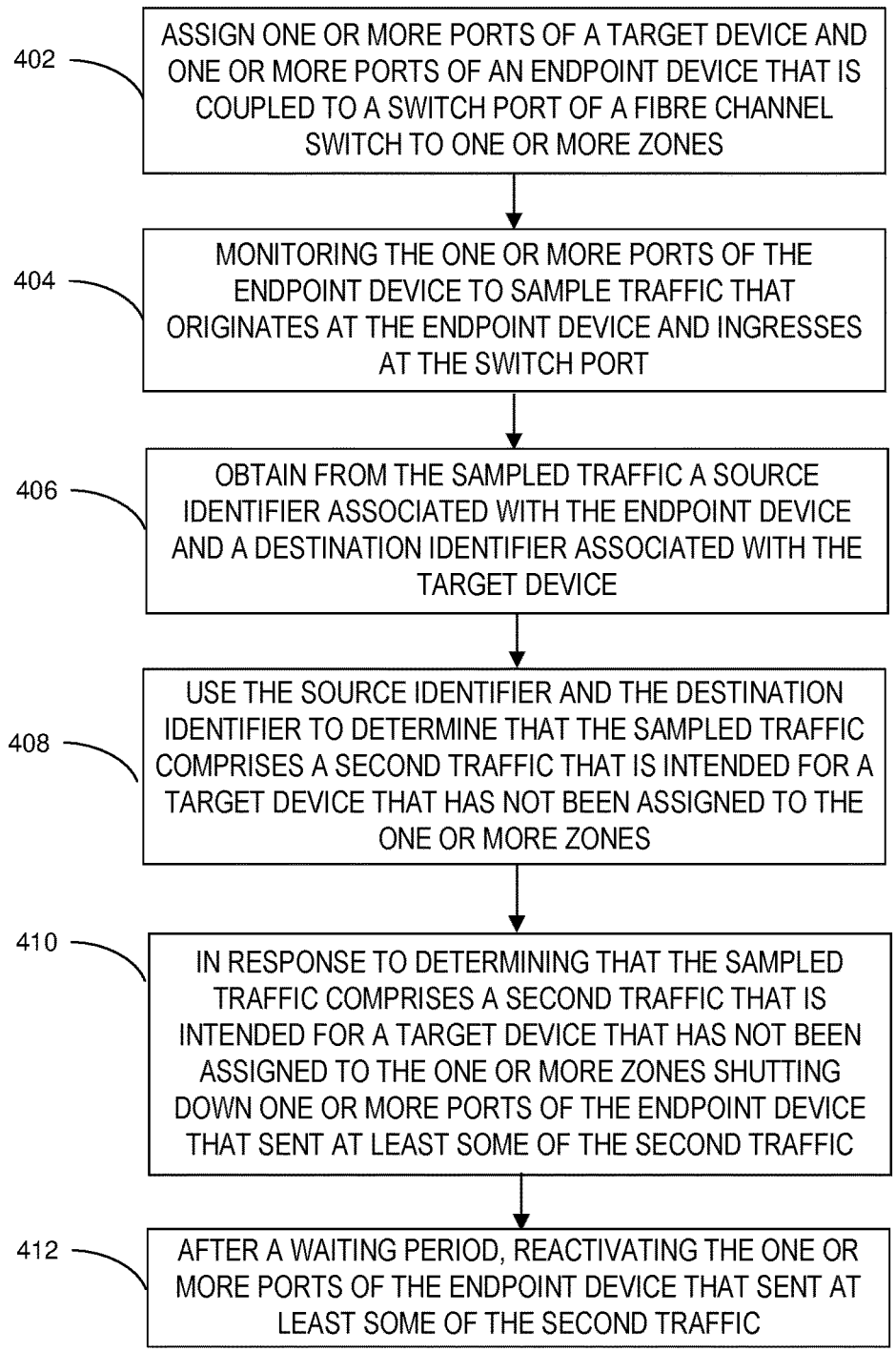
FIG. 4 is a flowchart depicting another method for handling soft zoning violations according to embodiments of the present disclosure.

FIG. 4 is a flowchart depicting another method for handling soft zoning violations, according to embodiments of the present disclosure. In embodiments, one or more ports of a first target device and one or more ports of an endpoint device, which is coupled to a switch port of an FC switch, may be assigned (402) to one or more zones. In embodiments, the one or more ports of the endpoint device may be monitored (404) to sample traffic that originates at the endpoint device and ingresses at the switch port. In embodiments, a source identifier associated with the endpoint device and a destination identifier associated with a target device may be obtained (406) and used to determine (408) that the sampled traffic comprises traffic intended for a target device that has not been assigned to the one or more zones. If so, any number of actions may be performed to restrict the non-assigned traffic. In embodiments, such actions may comprise shutting down (410) one or more ports of the endpoint device that sent at least some of the unassigned traffic and, after a waiting period or the occurrence of a particular event, reactivating (412) one or more ports of the endpoint device.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 5:
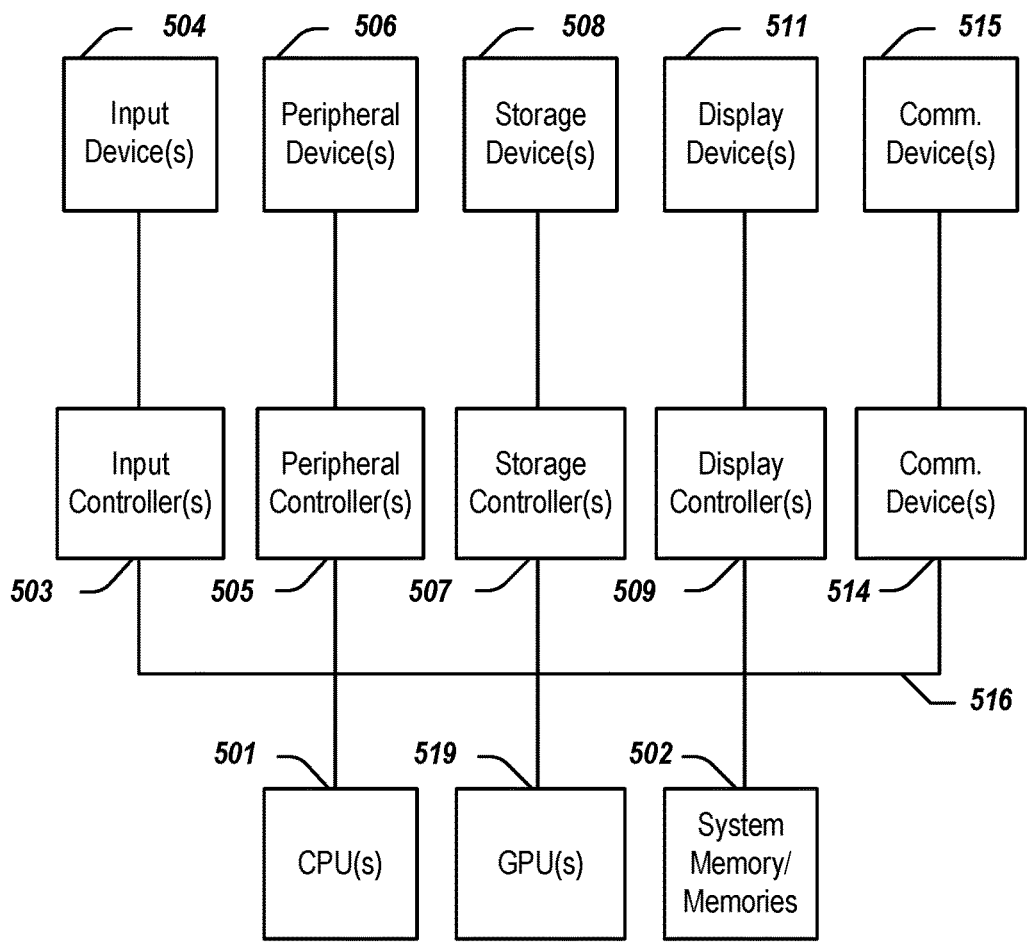
FIG. 5 depicts a simplified block diagram of an information handling system according to embodiments of the present invention.

FIG. 5 depicts a simplified block diagram of an information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 6:
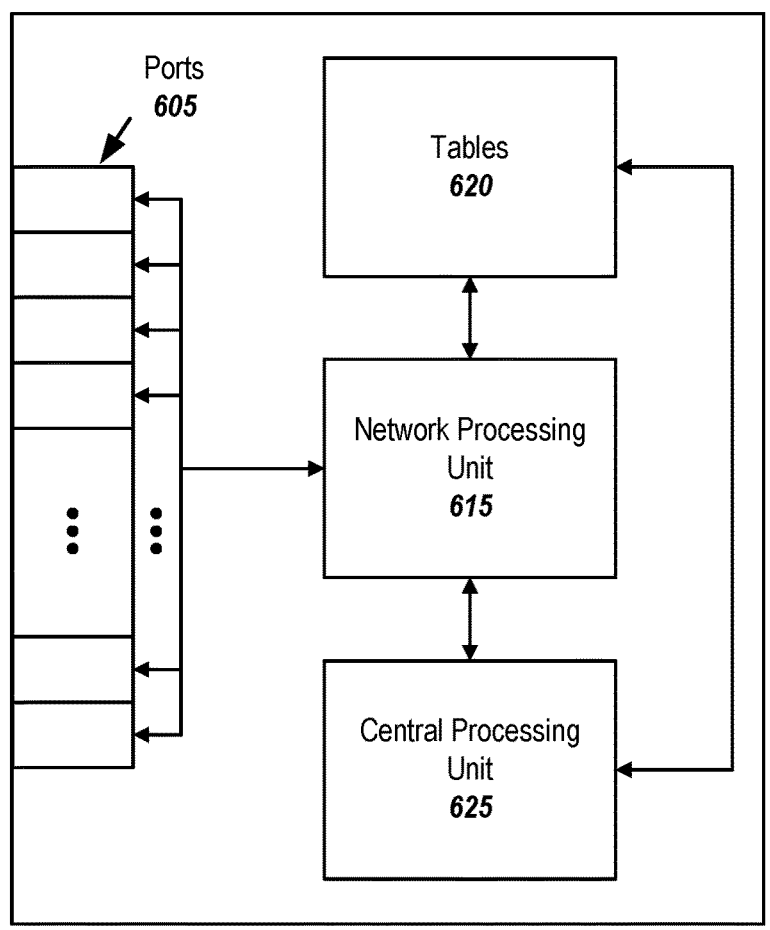
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components (including fewer or more components).

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for handling soft zoning violations, the method comprising:
   assigning a first target device and an endpoint device that is coupled to a switch port of a Fibre Channel (FC) switch to one or more zones in a soft zoning environment;
   in response to the endpoint device logging into the FC switch, obtaining sampled traffic that originates at the endpoint device and ingresses at the switch port;
   obtaining from the sampled traffic a source identifier associated with the endpoint device and a destination identifier associated with a target device; and
   using the source identifier and the destination identifier to determine that the sampled traffic comprises a second traffic that is intended for a second target device that has not been assigned to the one or more zones, performing one or more actions to restrict the second traffic.

2. The computer-implemented method of claim 1, wherein the step of obtaining the sampled traffic comprises monitoring one or more ports of the endpoint device.

3. The computer-implemented method of claim 1, wherein the one or more actions comprise configuring access control list (ACL) entries such as to deny permission to one or more ports of the endpoint device to access the second target device.

4. The computer-implemented method of claim 1, wherein the one or more actions comprise shutting down one or more ports of the endpoint device that sent at least some of the second traffic.

5. The computer-implemented method of claim 4, further comprising, in response to a condition, reactivating the one or more ports of the endpoint device that sent at least some of the second traffic.

6. The computer-implemented method of claim 5, wherein the condition comprises at least one of a condition associated with the second traffic or a waiting period.

7. The computer-implemented method of claim 1, wherein the step of performing one or more actions to restrict the second traffic comprises shutting down an interface through the endpoint device logged into the FC switch.

8. A Fibre Channel (FC) system for handling soft zoning violations, the system comprising:
   an FC switch comprising;
      a processor coupled to the FC switch; and
      a non-transitory computer-readable medium comprising instructions that, when executed by the processor, cause steps to be performed, the steps comprising:
         assigning a first target device and an endpoint device that is coupled to a switch port of the Fibre Channel (FC) switch to one or more zones in a soft zoning environment;
         in response to the endpoint device logging into the FC switch, obtaining sampled traffic that originates at the endpoint device and ingresses at the switch port;
         obtaining from the sampled traffic a source identifier associated with the endpoint device and a destination identifier associated with a target device;
         using the source identifier and the destination identifier to determine that the sampled traffic comprises a second traffic that is intended for a second target device that has not been assigned to the one or more zones; and
         performing one or more actions to restrict the second traffic.

9. The FC system of claim 8, wherein the FC switch instructs a device coupled to the endpoint device to cause the endpoint device to shut down one or more ports of the endpoint device that sent at least some of the second traffic.

10. The FC system of claim 9, wherein the FC switch, in response to one of a condition associated with the second traffic or a waiting period, causes the one or more ports of the endpoint device that sent at least some of the second traffic to be reactivated.

11. The FC system of claim 8, wherein the first and second target devices are storage devices.

12. The FC system of claim 8, wherein the processor configures an access control list (ACL) such as to deny permission to one or more ports of the endpoint device to access the second target device.

13. The FC system of claim 8, wherein the FC switch monitors one or more ports of the endpoint device to obtain the sampled traffic.

14. The FC system of claim 8, wherein the step of performing one or more actions to restrict the second traffic comprises causing a shut down of the switch port through which the endpoint device interfaces with the FC switch.

15. A non-transitory computer-readable medium or media comprising one or more sequences of instructions which, when executed by at least one processor, causes steps to be performed comprising:

assigning a first target device and an endpoint device that is coupled to a switch port of a Fibre Channel (FC) switch to one or more zones in a soft zoning environment;

in response to the endpoint device logging into the FC switch, obtaining sampled traffic that originates at the endpoint device and ingresses at the switch port;

obtaining from the sampled traffic a source identifier associated with the endpoint device and a destination identifier associated with a target device; and using the source identifier and the destination identifier to determine that the sampled traffic comprises a second traffic that is intended for a second target device that has not been assigned to the one or more zones, performing one or more actions to restrict the second traffic.

16. The non-transitory computer-readable medium or media of claim 15, wherein the step of obtaining the sampled traffic comprises monitoring one or more ports of the endpoint device.

17. The non-transitory computer-readable medium or media of claim 15, wherein the one or more actions comprise configuring access control list (ACL) entries such as to deny permission to one or more ports of the endpoint device to access the second target device.

18. The non-transitory computer-readable medium or media of claim 15, wherein the one or more actions comprise shutting down one or more ports of the endpoint device that sent at least some of the second traffic.

19. The non-transitory computer-readable medium or media of claim 18, further comprising, in response to a condition, reactivating the one or more ports of the endpoint device that sent at least some of the second traffic.

20. The non-transitory computer-readable medium or media of claim 19, wherein the condition comprises at least one of a condition associated with the second traffic or a waiting period.

* * * * *